United States Patent

Hartmann et al.

[15] 3,644,093
[45] Feb. 22, 1972

[54] METHOD AND APPARATUS FOR TREATING PRE-ENRICHED AMMONIA

[72] Inventors: Fortunat Hartmann, Zurich; Hans Rudolf Gisler, Winterthur, both of Switzerland

[73] Assignee: Sulzer Brothers, Ltd., Winterthur, Switzerland

[22] Filed: May 5, 1969

[21] Appl. No.: 821,862

[30] Foreign Application Priority Data
May 8, 1968 Switzerland ...........................6871/68

[52] U.S. Cl. ............................23/204 C, 23/283, 23/312 W, 62/17
[51] Int. Cl. .........................C01b 5/02, B01j 1/00, F25j 3/00
[58] Field of Search...................23/204 R, 210 I, 283, 204 C, 23/204 P, 312 W; 62/17

[56] References Cited

UNITED STATES PATENTS

| | | | |
|---|---|---|---|
| 3,028,222 | 4/1962 | Eriksson | 23/210 I |
| 3,206,365 | 8/1965 | Guernsey | 23/204 |

FOREIGN PATENTS OR APPLICATIONS

| | | | |
|---|---|---|---|
| 903,367 | 8/1962 | Great Britain | 23/204 |

Primary Examiner—Oscar R. Vertiz
Assistant Examiner—Hoke S. Miller
Attorney—Kenyon & Kenyon Reilly Carr & Chapin

[57] ABSTRACT

The pre-enriched ammonia is delivered into the exchange column prior to the final enrichment stage and is placed into a material exchange with a portion of the deuterium-impoverished water from the rectifying column. The material exchange enriches the water with deuterium. The enriched water is then fed into an intermediate point in the rectifying column for final enrichment.

12 Claims, 1 Drawing Figure

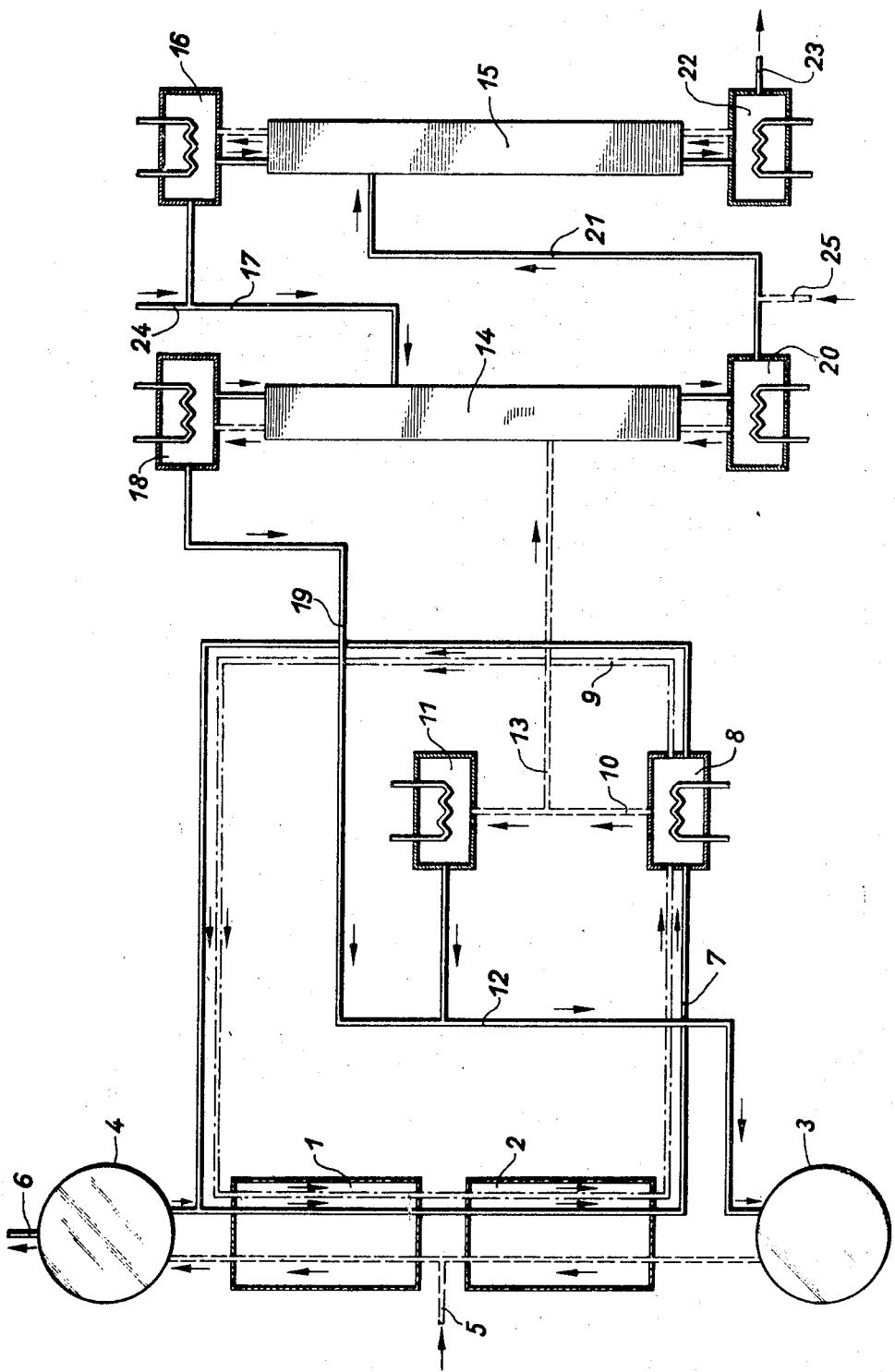

METHOD AND APPARATUS FOR TREATING PREENRICHED AMMONIA

This invention relates to a method and apparatus for treating preenriched ammonia. More particularly, this invention relates to a method and apparatus for treating a preenriched ammonia to process heavy water for a final enrichment stage.

Heretofore, it has been known in the production of heavy water, to preenrich ammonia and to use this ammonia in a final enrichment process to produce heavy water. The preenrichment of the ammonia can take various forms. For example, the preenrichment can be carried out in a "dithermal" or "monothermal" process.

In a monothermal preenrichment process, for example, a catalytically accelerated isotope exchange between ammonia and synthesis gas and a countercurrent of liquid ammonia containing a catalyst produces an ammonia enriched with deuterium; synthesis gas being converted into liquid ammonia at the place where there is a low deuterium concentration, and ammonia being converted into synthesis gas at the place where there is a high deuterium concentration. In a final enrichment process, after the catalyst has been removed from the preenriched ammonia and has been recycled into the preenrichment process at the places where there is a low concentration of deuterium, the ammonia containing a high concentration of deuterium from the preenrichment process receives further treatment and is finally used to produce heavy water.

In a conventional final enrichment stage associated with a monothermal preenrichment stage, for example, liquid ammonia is purified from the catalyst, e.g., potassium amide ($KHN_2$) and taken from the preenrichment stage at a place where there is a high concentration of deuterium, and is enriched in a rectifying column until it contains the required percentage of deuterium. In the process, liquid ammonia is fed in, and a countercurrent of ammonium vapor, further enriched with deuterium, is fed into the common base. The low deuterium ammonia leaving the column head is condensed and recycled into the preenrichment stage. The ammonia collecting in the bottom of the column and containing the required deuterium content, e.g., 99.8 percent, then has to be decomposed in a cracking plant into its constituent elements, viz. nitrogen, deuterium, and small quantities of hydrogen-deuterium and hydrogen. The mixture is then burnt with oxygen in a combustion chamber to form wet air containing a large proportion of heavy water vapor. Finally, the heavy water is condensed from the mixture in a condenser.

While only the most essential parts of the plant have been mentioned above, it is noted that additional equipment such as adsorption apparatus is generally also required in practice.

The conventional plant, which may often be associated with a different type of preenrichment stage, is very expensive and has the following serious disadvantages. Owing to the low boiling point of ammonia at a pressure of one atmosphere, considerable cooling is necessary in order to rectify the ammonia since it is desireable for economic reasons that the column should not operate at an unduly high pressure. If the ammonia is rectified at higher temperatures, e.g. at the temperature of the environment, the column will need to be constructed as a pressure container, and will be expensive and difficult to keep in a sealtight condition.

Further, if the required final enrichment in deuterium took place in the preenrichment stage, it would be necessary to circulate large quantities of synthesis gas and/or liquid ammonia having a high deuterium content in the preenrichment stage at high temperatures. Consequently, even if only small leaks would occur in the preenrichment apparatus such might allow large quantities of deuterium to escape.

Accordingly, it is an object of the invention to avoid relatively large deuterium losses.

It is another object of the invention to obtain heavy water in a considerably more economic manner than heretofore.

Briefly, the invention provides a method and apparatus for treating preenriched ammonia with a countercurrent of water containing a low deuterium content so as to enrich the water with deuterium prior to a final enrichment of the water to heavy water.

The apparatus includes a plant having an apparatus for evaporating at least a partial current of the preenriched ammonia, at least one exchange column into which the preenriched ammonia vapor is conveyed, and a rectifying column from which part of the liquified head product is conveyed into the exchange column. The exchange column functions so that an isotope exchange occurs between the preenriched ammonia vapor and the water and so that the water becomes enriched with deuterium and at least most of it is supplied through a means such as a pipe line into the rectifying column.

The apparatus for initially evaporating the ammonia has a preenriched stage comprising two exchange towers, an ammonia synthesis plant, an ammonia cracking plant, and an evaporator for concentrating the catalyst. This stage is advantageously constructed so that a means such as a pipe line for removing the preenriched ammonia vapor is connected to the evaporator and leads to a condenser connected by at least one means such as a pipe line to a place in the preenrichment stage where there is a high deuterium concentration. In addition, a means such as a pipe line branches off from a point between the line between the evaporator and the condenser and leads to the exchange column. The ammonia leaving the top of the exchange column is liquefied by a condenser from which at least some of the ammonia is conveyed back to the preenrichment stage. Also, a means such as a pipe line leads from the head of the rectifying column in order to supply water having a low deuterium content into the exchange column, and a similar line leads from the bottom of the exchange column so as to supply deuterium enriched water to the rectifying column.

The water vapor impurities which may occur in the apparatus are eliminated from the ammonia which is recycled after condensation from the exchange column to the preenrichment stage, and dissolved ammonia impurities are eliminated from the enriched water taken from the exchange column, by using condensed ammonia to wash out the water vapor content in the ammonia before condensation and by removing the ammonia content from the water flowing downwards through the exchange column before flowing into the rectifying column.

These and other objects and advantages of the invention will become more apparent from the following detailed description and appended claims taken in conjunction with the accompanying drawing in which:

The drawing schematically illustrates a plant utilizing the method and apparatus according to the invention.

Referring to the drawing, the heavy water plant includes a preenrichment stage, an exchange stage and a final enrichment stage.

The preenrichment stage includes two exchange towers 1, 2 in which a monothermal isotope exchange can take place, a cracking plant 3 in which ammonia is converted into a gaseous mixture of three molecules of hydrogen to 1 molecule of nitrogen so as to supply the gas reflux (schematically indicated by a chain line) in the exchange towers 1, 2, and an ammonia synthesis plant 4 which supplies the liquid reflux (schematically indicated by solid lines) to the exchange towers 1, 2. In addition, the preenrichment stage includes a means such as a pipe line 5 through which the stage is supplied with, for example, 1N synthesis gas ("N" denoting the natural deuterium concentration) for ammonia synthesis. The synthesis plant 4 is also connected with a means such as a pipe line 6 for conveying deuterium-impoverished ammonia from the plant 4.

The lower exchange tower 2 is connected via a means such as a pipe line 7 to an evaporator 8 so that the liquid ammonia in which a catalyst as is known is dissolved can be concentrated. The evaporator 8 in turn is connected via a means such as a pipe line 9 which completes the catalyst circuit to return the liquid ammonia to the feed line above or upstream of the upper exchange tower 1. The evaporator 8 is also connected via a means such as a pipe line 10 to a condenser 11 so as to direct the evaporated ammonia as a vapor to the condenser 11. The condenser 11 in turn is connected via a means such as a pipe line 12 to the cracking plant 3.

In use, liquid ammonia in the exchange tower 1 is enriched by isotope exchange with the hydrogen from the synthesis gas until its deuterium content is, e.g., 4 N, and is further enriched in the lower exchange tower 2 until its deuterium content is, e.g., 400 N. The liquid ammonia, in which the catalyst, e.g., potassium amide is dissolved, then flows through the line 7 to the evaporator 8 and concentrated. The nonevaporated ammonia containing the catalyst then flows back through a line 9 into the liquid ammonia feedline above the exchange tower 1.

The preenriched ammonia which has evaporated and separated from the catalyst is removed from the evaporator 8 through the line 10. Most of the ammonia vapor is then liquefied in the condenser 11 and fed through the line 12 to the cracking plant 3, so that the ammonia can be decomposed into its constituent elements nitrogen, hydrogen, hydrogen-deuterium and deuterium.

The exchange stage is connected to the preenrichment stage by a means such as a branch pipe line 13 which connects to the line 10 between the evaporator 8 and condenser 11 so as to draw off a portion of the preenriched ammonia vapor. The exchange stage includes an exchange column 14 to which the branch line 13 connects at an intermediate point. This exchange column 14 can contain a perforated bottom, bubble trays, or packing material as is known. Also, the exchange stage includes a condenser 18 at the upper end which receives the vapor from the exchange column to return the condensed vapor via a line 19 back to the cracking plant 3. An evaporator 20 is connected to the lower end of the exchange column 14 and is connected to the final enrichment stage via a means such as a pipe line 21 so as to convey the unevaporated liquid thereto.

The final enrichment stage contains a rectifying column 15 which receives the line 21 at an intermediate point. In addition, a condenser 16 is connected to the upper end of the rectifying column to deliver water into the rectifying column and via a means such as a pipe line 17 to an intermediate point in the exchange column 14 to deliver water thereinto. An evaporator 22 is connected at the lower end of the rectifying column 15 and has a means such as a pipe line 23 for removing a highly concentrated heavy water therefrom.

During use, a small proportion, e.g., 4 to 5 percent, of the ammonia vapor taken from the evaporator 8 in the preenrichment stage is conveyed via branch line 13 into the exchange column 14. In addition, a part of the vapor from the rectifying column head which is liquefied in the condenser 16 used to cool the column 15 is fed via line 17 which is disposed above line 13, into the exchange column 14. The deuterium-impoverished water (head product) having a deuterium content of, e.g., 300 N, thus flows down the exchange column 14 while the preenriched ammonia vapor flows upwardly so that an isotope exchange occurs. As a result, the deuterium in the ammonia passes into the water.

After being collected in the evaporator 20, the deuterium enriched water is fed via line 21 into the rectifying column 15 which as above can have a perforated bottom, a bubble tray or packing material while the remainder of the head product from the condenser 16 is delivered at the top of the column 15 and the vapor from the evaporator 22 is delivered at the bottom. The enriched water is then finally enriched by the isotope exchange which takes place in the rectifying column.

The finally enriched water then collects in the evaporator 22 which is used to heat the rectifying column 15 and is removed via the line 23.

It is noted that in the part of the exchange column 14 above the water inlet line 17, the water vapor in the upward flow of ammonia vapor is almost completely washed out in a number of separating stages, as follows: ammonia is liquefied in condenser 18 and a portion is recycled as a reflux into column 14, so that the water vapor in the upward stream of ammonia vapor is absorbed by the downward stream of liquid ammonia. Also, most of the condensed ammonia flows through lines 19 and 21 back to the cracking apparatus 3 in the preenrichment stage. In principle, however, the condensed ammonia can by recycled through line 19 to another part of the preenrichment phase.

Further, in the part of column 14, below the ammonia vapor inlet line 13, the dissolved ammonia content is removed by rectification in a number of separating stages from the downward stream of deuterium enriched water. To this end, a small amount of bottoms comprising enriched water is evaporated in the evaporator 20 and recycled into the exchange column 14. As a result, the ammonia dissolved in the liquid phase continuously evaporates and passes into the stream upon rising.

While the exchange column 14 is shown as having three parts, an upper part in which most of the water vapor is washed out of the upward stream of deuterium-impoverished ammonia vapor, a middle part in which the deuterium in the ammonia supply is conveyed by isotope exchange into a countercurrent of water, and a bottom part in which most of the dissolved ammonia is removed by rectification from the downward stream of enriched water, the exchange column 14 can alternatively be replaced by three separate columns, each of which fulfills one of the aforementioned functions.

It is further noted that a heating or cooling medium, e.g., water, can be supplied to the plant from outside. Further, the final product, i.e., heavy water, taken from the rectifying column 15 through line 23 can be replaced by adding an equivalent quantity of water through a feed line (not shown) terminating in line 17 or line 21. Ordinary water can be used for the replacement water.

The invention enables the heavy water, should the amount of concentrated water produced in the rectifying column be insufficient, e.g., because of faults in the plant or during the starting up period and which would otherwise be useless, to be returned into the plant from a tapping point in line 23 through a pipe line 24 connected into line 17 or a pipe line 25 connected into line 21.

Further, the invention allows the rectifying column and, if necessary, the exchange column to have correspondingly larger diameters. Also, the inlet lines 24 and/or 25 can be connected to a point for removing deuterium-impoverished water in a reactor. As a result, the final enrichment stage according to the invention, besides producing as much heavy water as required, can also process heavy water whose deuterium content has been reduced in a reactor.

What is claimed is:

1. A plant for producing heavy water from a material exchange between water and ammonia comprising
   means for preenriching ammonia vapor with deuterium,
   at least one exchange column having means for receiving a portion of the preenriched ammonia vapor at an intermediate point thereof,
   a rectifying column having means for delivering a liquefied head product thereto for isotope exchange with a deuterium enriched vapor to produce heavy water,
   means between said delivering means and said exchange column for feeding a part of the liquefied head product to said exchange column for isotope exchange with the preenriched ammonia vapor therein,
   means between said exchange column and an intermediate point of said rectifying column for feeding deuterium enriched water from said exchange column to said rectifying column, and
   means for removing heavy water from said rectifying column.

2. A plant as set forth in claim 1 wherein said means for preenriching ammonia includes at least two exchange towers, an ammonia synthesis plant for supplying liquid reflux to said towers, an ammonia cracking plant for supplying gas reflux to said towers, an evaporator connected to said towers for concentrating the preenriched ammonia vapor therein, and a condenser connected between said evaporator and said cracking plant for condensing a portion of the preenriched ammonia vapor therein for delivery to said cracking plant.

3. A plant as set forth in claim 2 further comprising a means between said evaporator and said exchange column for conveying a portion of the preenriched ammonia vapor to said exchange column, a condenser at the top of said exchange column for liquefying ammonia vapor therein, and a means connecting said condenser to said cracking plant for recycling the ammonia thereto.

4. A plant as set forth in claim 1 further comprising a water supply pipeline terminating in said means for feeding the liquid head to said exchange column.

5. A plant as set forth in claim 4 wherein said water supply pipeline is connected to said means for removing heavy water whereby insufficiently concentrated heavy water can be recirculated through said supply line.

6. A plant as set forth in claim 4 wherein said water supply pipeline is connected to a reactor outside said plant whereby deuterium-impoverished heavy water from a reactor can be suppled to said plant.

7. A plant as set forth in claim 1 which further comprises a water supply pipe line terminating in said means between said columns for supplying water to said rectifying column.

8. A plant as set forth in claim 7 wherein said water supply pipe line is connected to said means for removing heavy water whereby insufficiently concentrated heavy water can be recirculated through said supply pipeline.

9. A plant as set forth in claim 7 wherein said water supply pipeline is connected to a reactor outside said plant whereby deuterium-impoverished heavy water from a reactor can be supplied to said plant.

10. A method of producing heavy water which comprises the steps of
preenriching ammonia vapor with deuterium;
directing at least a part of the preenriched ammonia vapor into a countercurrent flow to water having a low deuterium content for isotope exchange to enrich the water to a higher deuterium content; and
directing the enriched water with a liquefied flow of a head product containing water with a low deuterium content in a countercurrent flow to a vapor of the head product and enriched water for producing a final deuterium enriched heavy water.

11. A method as set forth in claim 10 which further comprises the step of directing a part of the head product into the countercurrent flow between the preenriched ammonia and water having a low deuterium content in counter flow to the preenriched ammonia.

12. A method as set forth in claim 10 which further comprises the steps of washing out the water vapor in the uncondensed ammonia vapor flow at an upper end of said flow with condensed ammonia, and rectifying the ammonia from the enriched water flow prior to directing the enriched water flow into the countercurrent flow with the vapor of the head product.

* * * * *